US012705121B2

(12) United States Patent
Liu et al.

(10) Patent No.: US 12,705,121 B2
(45) Date of Patent: Aug. 11, 2026

(54) MESSAGE NOTIFICATION METHOD AND APPARATUS

(71) Applicant: HUAWEI TECHNOLOGIES CO., LTD., Shenzhen (CN)

(72) Inventors: Rongguo Liu, Xi'an (CN); Xiaoyan Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 472 days.

(21) Appl. No.: 18/334,797

(22) Filed: Jun. 14, 2023

(65) Prior Publication Data

US 2023/0325262 A1 Oct. 12, 2023

Related U.S. Application Data

(63) Continuation of application No. PCT/CN2020/136625, filed on Dec. 15, 2020.

(51) Int. Cl.
*G06F 9/54* (2006.01)

(52) U.S. Cl.
CPC .................................... *G06F 9/546* (2013.01)

(58) Field of Classification Search
None
See application file for complete search history.

(56) References Cited

U.S. PATENT DOCUMENTS 5,345,424 A * 9/1994 Landgraf ................ G11C 7/22 365/218
11,442,852 B2 * 9/2022 Lindberg .............. G06F 3/0659
2008/0162814 A1 7/2008 Kim
2012/0144097 A1 * 6/2012 Hashimoto ........... G06F 3/0608 711/E12.008
2014/0068147 A1 * 3/2014 Ou ......................... G11C 29/00 711/103
2016/0103480 A1 * 4/2016 Sanghi .................. G06F 1/3228 713/323
2017/0069395 A1 * 3/2017 Yao ..................... G06F 12/0246
2017/0109081 A1 * 4/2017 Iketaki .................. G06F 3/0659

(Continued)

FOREIGN PATENT DOCUMENTS

CN 1893380 A 1/2007
CN 101174246 A * 5/2008 ............. G06F 12/16
CN 101644994 A 2/2010

(Continued)

OTHER PUBLICATIONS

JEDEC Standard, "Universal Flash Storage (UFS) Unified Memory Extention Version 1.0," Dec. 21, 2015, 92 pages.

(Continued)

*Primary Examiner* — Charles E Anya
(74) *Attorney, Agent, or Firm* — Fish & Richardson P.C.

(57) ABSTRACT

This application provides a message notification method and apparatus. One example message notification method includes: A flash memory receives a first sleep request from a master chip. The flash memory detects an execution status of a working command initiated by a local end. The working command is used to initiate a read/write operation with the master chip. The flash memory sends a first notification to the master chip, where the first notification indicates the execution status of the working command.

20 Claims, 5 Drawing Sheets

(56) References Cited

U.S. PATENT DOCUMENTS

2019/0163256 A1* 5/2019 Lewis .................. G06F 1/3287
2019/0286219 A1* 9/2019 Anazawa ............... G06F 3/068

FOREIGN PATENT DOCUMENTS

CN 103389963 A 11/2013
CN 103605623 A * 2/2014
CN 107688344 A 2/2018

OTHER PUBLICATIONS

JEDEC Standard (Revision of JESD220C), "Universal Flash Storage (UFS) Version 3.0," Jan. 2018, 406 pages.
MIPI Board, "Specification for Unified Protocol version 1.8," Jan. 11, 2018, 390 pages.
International Search Report and Written Opinion in International Appln. No. PCT/CN2020/136625, mailed on Aug. 26, 2021, 15 pages (with English translation).
Extended European Search Report in European AppIn No. 20965416.9, dated Dec. 13, 2023, 8 pages.
Extended European Search Report in European Appln. No. 20965416.9, mailed on Dec. 13, 2023, 9 pages.

* cited by examiner

MESSAGE NOTIFICATION METHOD AND APPARATUS

CROSS-REFERENCE TO RELATED APPLICATIONS

This application is a continuation of International Application No. PCT/CN 2020/136625, filed on Dec. 15, 2020, the disclosure of which is hereby incorporated by reference in its entirety.

TECHNICAL FIELD

This application relates to the chip field, and in particular, to a message notification method and apparatus.

BACKGROUND

With development of science and technology, an electronic device has more functions, and consequently power consumption of the electronic device increases accordingly. Therefore, when the electronic device has no service to be processed, both a master chip and a flash memory of the electronic device may enter a sleep state, to reduce the power consumption of the electronic device. Specifically, the master chip may send a sleep request to the flash memory, receive sleep-permission indication information from the flash memory, and disable a first transmission channel for sending data to the flash memory by the master chip, to enter the sleep state. Correspondingly, after sending the sleep-permission indication information to the master chip, the flash memory may disable, after performing a necessary internal operation, a second transmission channel for sending data to the master chip by the flash memory, to enter the sleep state. However, the foregoing sleep procedure does not consider a scenario in which a flash memory side needs to send a working command to the master chip. Therefore, if the flash memory side needs to send a working command to the master chip, the foregoing sleep procedure may cause a problem that the working command cannot continue to be executed and consequently a data loss is caused due to a read/write error of the flash memory, resulting in low reliability.

To resolve the problem that the working command on the flash memory side cannot continue to be executed, before the foregoing sleep procedure is performed, a solution in which software of the master chip queries an execution status of the working command on the flash memory side before the software of the master chip actively initiates the sleep request may be introduced. Specifically, the software of the master chip may actively send a query command to the flash memory periodically to query whether a working command being executed and/or a working command to be executed exist/exists on the flash memory side, and the master chip and the flash memory perform the foregoing sleep procedure only when the software of the master chip learns that no working command that needs to be executed exists on the flash memory side.

However, the foregoing query step may need to be performed a plurality of times. This causes extra signaling overheads, and causes long duration and low efficiency of the sleep procedure. In addition, a plurality of query commands sent by the master chip to the flash memory are all actively initiated by the software of the master chip. A logic circuit of the master chip can only perform command scheduling and transmission, but cannot actively initiate a query command. In other words, the logic circuit of the master chip does not support actively initiating a query command. To be specific, in a scenario in which the logic circuit of the master chip initiates a sleep request to the flash memory, the master chip may enter the sleep state before execution of a working command of the flash memory is completed, and consequently, a read/write error of the flash memory and a data loss may be caused, resulting in low reliability.

SUMMARY

This application provides a message notification method and apparatus, to resolve a problem that a sleep procedure is time-consuming because a master chip may need to perform query a plurality of times to learn of an execution status of a working command of a flash memory, so as to effectively reduce signaling overheads between the master chip and the flash memory, improve sleep efficiency, and reduce power consumption. In addition, the message notification method and apparatus are applicable to a scenario in which a logic circuit of the master chip actively initiates a sleep request to the flash memory, to improve sleep reliability.

To achieve the foregoing objective, this application uses the following technical solutions.

According to a first aspect, a message notification method is provided, applied to a flash memory of a terminal device. The terminal device further includes a master chip. The method includes: The flash memory receives a first sleep request from the master chip. The flash memory detects an execution status of a working command initiated by a local end. The working command is used to initiate a read/write operation with the master chip. The flash memory sends a first notification to the master chip. The first notification indicates the execution status of the working command and whether the first sleep request conflicts with execution of the working command.

Based on the message notification method provided in the first aspect, after receiving the first sleep request from the master chip, the flash memory may automatically detect the execution status of the working command initiated by the local end, and actively send a detection result to the master chip. Therefore, the master chip can obtain the execution status of the working command of the flash memory without sending a plurality of query commands to the flash memory. This can effectively reduce signaling overheads between the master chip and the flash memory, improve sleep efficiency, and reduce power consumption. In addition, the execution status of the working command is actively sent by the flash memory to the master chip, but is not queried by the master chip by sending a query command. Therefore, regardless of a sleep request actively initiated by software of the master chip or a sleep request actively initiated by a logic circuit of the master chip, the master chip can obtain the execution status of the working command of the flash memory. This can ensure that the working command of the flash memory is not lost and ensure integrity of the data read/write operation, or ensure reliability of entering a sleep state by the flash memory.

In a possible design solution, the first notification may indicate that there is a working command in a being-executed state or a to-be-executed state and the first sleep request conflicts with execution of the working command. After receiving the first notification indicating that there is the working command in the being-executed state or the to-be-executed state, the master chip may learn that the first sleep request initiated by the master chip conflicts with the working command initiated by the flash memory, and the master chip and the flash memory fail to enter a sleep state this time, so that the flash memory continues to execute the working command. This ensures that the working command of the flash memory is not lost.

Further, after the flash memory sends the first notification to the master chip, the method provided in the first aspect may further include: The flash memory continues to execute the working command. In this way, it can be ensured that the working command is not affected by the first sleep request sent by the master chip, and an original process can continue to be performed.

Alternatively, further, after the flash memory sends the first notification to the master chip, the method provided in the first aspect may further include: The flash memory receives a second sleep request from the master chip. After sending the first notification to the master chip, the flash memory continues to execute the working command. When the second sleep request is received, if execution of the working command of the flash memory is completed, the flash memory may enter a sleep state, so that power consumption can be reduced.

In another possible design solution, the first notification may indicate that there is no working command in a being-executed state or a to-be-executed state and the first sleep request does not conflict with execution of the working command. After the master chip receives the first notification indicating that there is no working command in the being-executed state or the to-be-executed state, the flash memory and the master chip separately enter a sleep state according to an agreed procedure, to reduce power consumption.

Further, after the flash memory sends the first notification to the master chip, the method provided in the first aspect may further include: The flash memory disables a command sending function, and enters a sleep state. After the flash memory disables the command sending function, even if a working command is generated again, the flash memory no longer sends the working command to the master chip. Therefore, a loss of the working command is not caused.

In a possible design solution, a protocol stack of the flash memory may include a physical layer and firmware. That the flash memory detects an execution status of a working command may include: The physical layer sends an interrupt processing request to the firmware after receiving the first sleep request. Correspondingly, the firmware detects the execution status of the working command in response to the interrupt processing request, and sends a detection result to the physical layer.

According to a second aspect, a message notification apparatus is provided, used in a flash memory of a terminal device. The terminal device further includes a master chip. The apparatus includes a transceiver unit and a processing unit. The transceiver unit is configured to receive a first sleep request from the master chip. The processing unit is configured to detect an execution status of a working command initiated by a local end. The working command is used to initiate a read/write operation with the master chip. The transceiver unit is further configured to send a first notification to the master chip. The first notification indicates the execution status of the working command and whether the first sleep request conflicts with execution of the working command.

In a possible design solution, the first notification may indicate that there is a working command in a being-executed state or a to-be-executed state and the first sleep request conflicts with execution of the working command.

Further, the processing unit may be configured to continue to execute the working command after the first notification is sent to the master chip.

Alternatively, further, the transceiver unit may be configured to receive a second sleep request from the master chip after the flash memory sends the first notification to the master chip.

In another possible design solution, the first notification may alternatively indicate that there is no working command in a being-executed state or a to-be-executed state and the first sleep request does not conflict with execution of the working command.

Further, the processing unit may be configured to: after the flash memory sends the first notification to the master chip, disable a command sending function and enter a sleep state.

In a possible design solution, a protocol stack of the flash memory may include a physical layer and firmware, the processing unit is specifically used by the physical layer to send an interrupt processing request to the firmware after the first sleep request is received, the firmware detects the execution status of the working command in response to the interrupt processing request, and the firmware sends a detection result to the physical layer.

Optionally, the transceiver unit provided in the second aspect may include a receiving unit and a sending unit. The sending unit is configured to implement a sending function of the message notification apparatus according to the second aspect, and the receiving unit is configured to implement a receiving function of the message notification apparatus according to the second aspect.

Optionally, the apparatus provided in the second aspect may further include a storage unit. The storage unit stores a program or instructions. When a processing module executes the program or the instructions, the apparatus is enabled to perform the message notification method according to the first aspect.

It should be noted that the message notification apparatus according to the second aspect may be a terminal device or a network device, may be a chip (system) or another part or component that can be disposed in a terminal device or a network device, or may be an apparatus that includes a terminal device or a network device. This is not limited in this application.

According to a third aspect, a message notification method is provided, applied to a master chip of a terminal device. The terminal device further includes a flash memory. The method includes: The master chip sends a first sleep request to the flash memory. The master chip receives a first notification from the flash memory. The first notification indicates an execution status of a working command and whether the first sleep request conflicts with execution of the working command. The working command is used by the flash memory to initiate a read/write operation with the master chip.

In a possible design solution, the first notification may indicate that there is a working command in a being-executed state or a to-be-executed state and the first sleep request conflicts with execution of the working command. After the master chip receives the first notification from the flash memory, the method according to the third aspect may further include: The master chip starts a timer. The master chip sends a second sleep request to the flash memory after the timer expires.

In a possible design solution, the first notification may indicate that there is no working command in a being-executed state or a to-be-executed state and the first sleep request does not conflict with execution of the working command. After the master chip receives the first notification from the flash memory, the method according to the third aspect may further include: The master chip enters a sleep state.

According to a fourth aspect, a message notification apparatus is provided, used in a master chip of a terminal device. The terminal device further includes a flash memory. The apparatus includes a sending unit and a receiving unit. The sending unit is configured to send a first sleep request to the flash memory. The receiving unit is configured to receive a first notification from the flash memory. The first notification indicates an execution status of a working command and whether the first sleep request conflicts with execution of the working command. The working command is used by the flash memory to initiate a read/write operation with the master chip.

In a possible design solution, the first notification may indicate that there is a working command in a being-executed state or a to-be-executed state and the first sleep request conflicts with execution of the working command. The apparatus according to the fourth aspect may further include a processing unit. The processing unit is configured to start a timer. The sending unit may be further configured to send a second sleep request to the flash memory after the timer expires.

In a possible design solution, the first notification may indicate that there is no working command in a being-executed state or a to-be-executed state and the first sleep request does not conflict with execution of the working command. The apparatus according to the fourth aspect may further include a processing unit. The processing unit is configured to enable the master chip to enter a sleep state.

Optionally, the receiving unit and the sending unit provided in the fourth aspect may be integrated into one transceiver unit, and the transceiver unit is configured to implement a sending function and a receiving function of the message notification apparatus according to the fourth aspect.

Optionally, the apparatus provided in the fourth aspect may further include a storage unit. The storage unit stores a program or instructions. When a processing module executes the program or the instructions, the apparatus is enabled to perform the message notification method according to the third aspect.

It should be noted that the message notification apparatus according to the fourth aspect may be a terminal device or a network device, may be a chip (system) or another part or component that can be disposed in a terminal device or a network device, or may be an apparatus that includes a terminal device or a network device. This is not limited in this application.

According to a fifth aspect, this application further provides an electronic device. The electronic device includes a flash memory, a read-only memory, and one or more computer programs. The one or more computer programs are stored in the read-only memory, and when the computer programs are executed by the flash memory, the electronic device is enabled to perform the message notification method in the first aspect or the third aspect.

According to a sixth aspect, an embodiment of this application further provides a computer-readable storage medium. The computer-readable storage medium includes a computer program or instructions. When the computer program or instructions is/are run on a computer, the computer is enabled to perform the message notification method in the first aspect or the third aspect.

According to a seventh aspect, this application further provides a computer program product. The computer program product includes a computer program or instructions. When the computer program or instructions is/are run on a computer, the computer is enabled to perform the message notification method in the first aspect or the third aspect.

It may be understood that the apparatus provided in the second aspect, the method provided in the third aspect, the apparatus provided in the fourth aspect, the electronic device provided in the fifth aspect, the computer-readable storage medium provided in the sixth aspect, and the computer program product provided in the seventh aspect are all used to perform the corresponding method provided above. Therefore, for beneficial effects that can be achieved, refer to the beneficial effects in the corresponding method provided above. Details are not described herein again.

DESCRIPTION OF EMBODIMENTS

The following describes technical terms in embodiments of this application.

Universal flash storage: A universal flash storage (universal flash storage, UFS) is a memory that is built based on a serial data transmission technology and that is allowed to be erased or written a plurality of times in an operation. Although there are only two data channels between an internal storage unit of the universal flash storage and a master chip, an actual data transmission speed of the universal flash storage is very high because serial data transmission is used. The UFS supports a full-duplex mode. All data channels can perform a read/write operation at the same time, and a data read/write response speed is very high.

Universal flash storage host controller interface (universal flash storage host controller interface, UFSHCI): An external interface between a master chip and a flash memory is a UFS interface. The master chip implements control and data exchange for the UFS by using an APB bus and an AXI bus. When the master chip accesses the UFSHCI through the APB bus, an address space of the UFS can be directly accessed by the master chip by applying for a virtual address space in a kernel by using ioremap. The master chip may further perform application by using a dma_alloc interface to access the UFS through the AXI bus.

The following describes technical solutions of this application with reference to accompanying drawings.

A message notification method provided in embodiments of this application may be applied to an electronic device. The electronic device may be a mobile phone, a tablet computer, a notebook computer, an ultra-mobile personal computer (ultra-mobile personal computer, UMPC), a handheld computer, a netbook, a personal digital assistant (personal digital assistant, PDA), a wearable electronic device, a virtual reality device, or the like. This is not limited in embodiments of this application.

Figure 1:
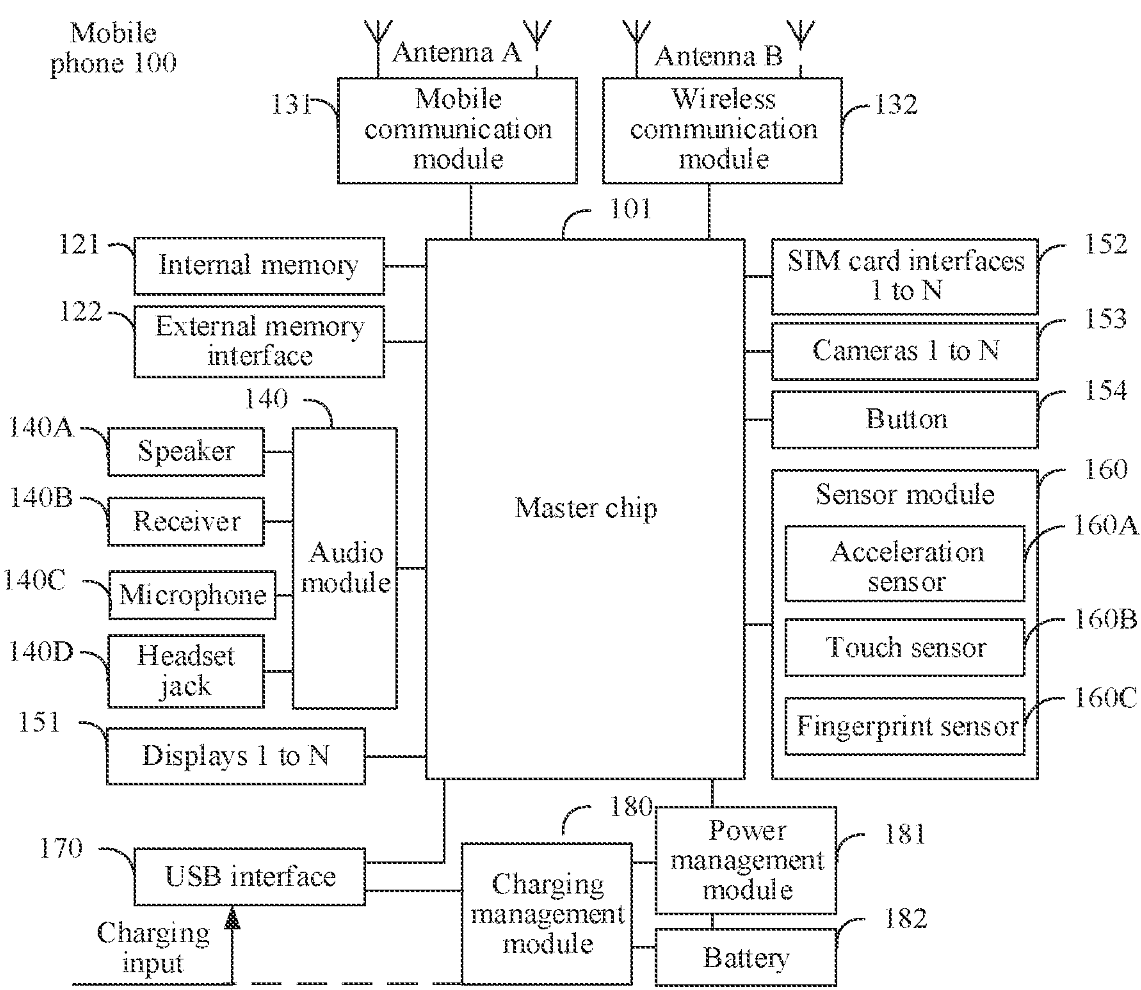
FIG. 1 is a schematic diagram of a hardware structure of a mobile phone according to an embodiment of this application.

For example, as shown in FIG. 1, the electronic device in embodiments of this application may be a mobile phone 100. The following specifically describes the embodiments by using the mobile phone 100 as an example. It should be understood that the mobile phone 100 shown in the figure is merely an example of the electronic device, and the mobile phone 100 may have more or fewer components than those shown in the figure, may combine two or more components, or may have different component configurations.

As shown in FIG. 1, the mobile phone 100 includes a master chip 101, an internal memory 121, an external memory interface 122, an antenna A, a mobile communication module 131, an antenna B, a wireless communication module 132, an audio module 140, a speaker 140A, a receiver 140B, a microphone 140C, a headset jack 140D, a display 151, a subscriber identification module (subscriber identification module, SIM) card interface 152, a camera 153, a button 154, a sensor module 160, a universal serial bus (universal serial bus, USB) interface 170, a charging management module 180, a power management module 181, and a battery 182. In some other embodiments, the mobile phone 100 may further include a motor, an indicator, and the like.

The master chip 101 may include one or more processing units. For example, the master chip 101 may include an application processor (application processor, AP), a modem, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). It should be noted that different processing units may be independent components, or may be integrated into one or more independent processors, or may be integrated into a same component with another module in the mobile phone 100.

The internal memory 121 may be configured to store data and/or at least one computer program, and the at least one computer program includes instructions. Specifically, the internal memory 121 may include a program storage area and a data storage area. The program storage area may store at least one computer program. The computer program may include an application (for example, Gallery or Contacts), an operating system (for example, an Android operating system or an iOS operating system), another program, or the like. The data storage area may store at least one of data created in a process of using the mobile phone 100, data received from another device (for example, another mobile phone 100, a network device, or a server), data pre-stored before delivery, or the like. For example, the data stored in the internal memory 121 may be at least one piece of information such as an image, a file, or an identifier.

In some embodiments, the internal memory 121 may include a high-speed random access memory and/or a non-volatile memory. For example, the internal memory 121 includes one or more magnetic disk storage devices, a flash (flash) memory, a universal flash storage (universal flash storage, UFS), or the like.

The master chip 101 may invoke one or more computer programs and/or data stored in the internal memory 121, so that the mobile phone 100 implements one or more functions, to meet a user requirement. For example, the master chip 101 may invoke the instructions and the data stored in the internal memory 121, so that the electronic device performs the message notification method provided in embodiments of this application.

The external memory interface 122 may be configured to connect to an external memory card (such as a micro SD card), to extend a storage capability of the mobile phone 100. The external memory card communicates with the master chip 101 through the external memory interface 122, to implement a data storage function. For example, files such as images, music, and videos are stored in the external memory card.

In some embodiments, a buffer may be further disposed in the master chip 101, to store instructions and/or data that need/needs to be cyclically used by the master chip 101. If the master chip 101 needs to use the instructions or the data again, the instructions or the data may be directly invoked from the buffer. This helps avoid repeated access, and reduce a waiting time of the master chip 101, so as to help improve system efficiency. For example, the buffer may be implemented by using a cache.

It should be understood that the structure of the mobile phone 100 shown in FIG. 1 is merely an example. The mobile phone 100 in this embodiment of this application may have more or fewer components than those shown in the figure, may combine two or more components, or may have different component configurations. The components shown in the figure may be implemented in hardware including one or more signal processing and/or application-specific integrated circuits, software, or a combination of hardware and software.

Figure 2:
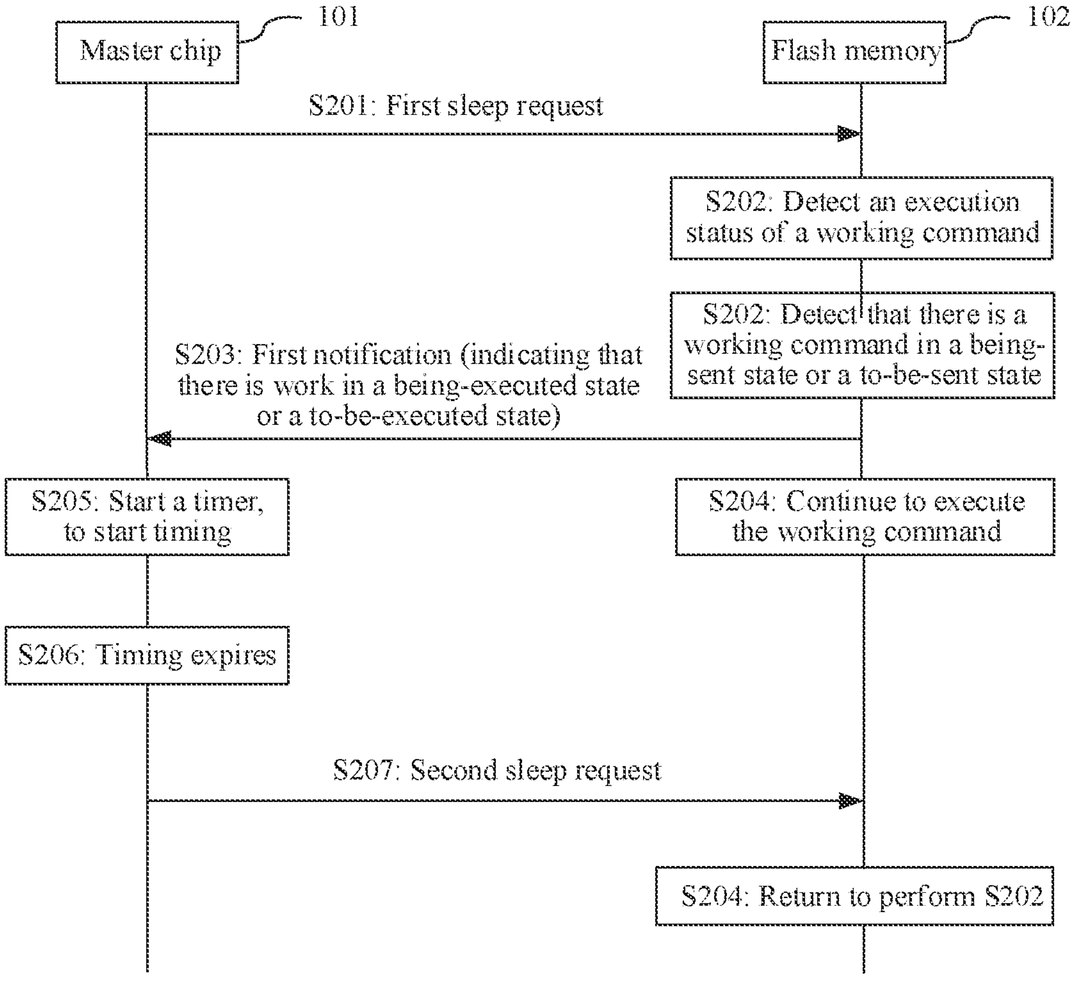
FIG. 2 is a schematic flowchart 1 of a message notification method according to an embodiment of this application.

For example, FIG. 2 is a schematic flowchart 1 of a message notification method according to an embodiment of this application. For example, the mobile phone 100 is the foregoing electronic device. The message notification method may be applied to the flash memory and the master chip of the mobile phone 100. The method may include the following steps.

S201: The master chip 101 sends a first sleep request to the flash memory 102, and the flash memory 102 receives the first sleep request from the master chip 101.

The master chip 101 and the flash memory 102 may interact with each other by using a data transmission link, and the data transmission link may include a first transmission channel and a second transmission channel. The first transmission channel and the second transmission channel may be implemented based on a same group of buses connecting the master chip 101 and the flash memory 102; or the first transmission channel is implemented based on one group of buses connecting the master chip 101 and the flash memory 102, and the second transmission channel is implemented based on another group of buses connecting the master chip 101 and the flash memory 102. The first transmission channel is used by the master chip 101 to transmit data/a signal to the flash memory 102, and the second transmission channel is used by the flash memory 102 to transmit data/a signal to the master chip 101. To reduce power consumption, when the master chip 101 does not need to access the flash memory, the master chip 101 may send the first sleep request to the flash memory 102 through the first transmission channel, so that both the master chip 101 and the flash memory 102 enter a sleep state, to reduce power consumption.

A protocol stack of the master chip 101 includes firmware and a physical layer. Specifically, a process in which the master chip 101 detects whether the flash memory needs to be accessed may be as follows: When the firmware of the master chip 101 needs to read data from the flash memory 102, the firmware reads the data from the flash memory 102 by using the physical layer. Alternatively, when the firmware of the master chip 101 needs to write data, the firmware of the master chip 101 writes the data into a double data rate synchronous dynamic random access memory (double data rate synchronous dynamic random access memory, DDR), and notifies the physical layer of the master chip 101 to send a data write request to the flash memory 102. After receiving the data write request, the flash memory 102 sends a data obtaining indication packet to the master chip 101. After receiving the data obtaining indication packet, the master chip 101 writes the data into the flash memory 102. Regardless of whether the firmware of the master chip 101 needs to read data, write data, or transmit another command, the master chip 101 determines that the flash memory needs to be accessed. On the contrary, when the firmware of the master chip 101 neither needs to read data nor needs to write data, and does not need to transmit another command, the master chip 101 determines that no service needs to be processed.

In addition, the flash memory 102 may also include firmware and a physical layer, and the physical layer of the flash memory 102 receives the first sleep request from the master chip 101, and sends the first sleep request to the firmware of the flash memory 102.

S202: The flash memory 102 detects an execution status of a working command initiated by a local end.

The working command is used to initiate a data read/write operation with the master chip 101. The execution status of the working command includes at least that a working command is being executed, a working command is to be executed, and no working command is to be executed.

Figure 3:
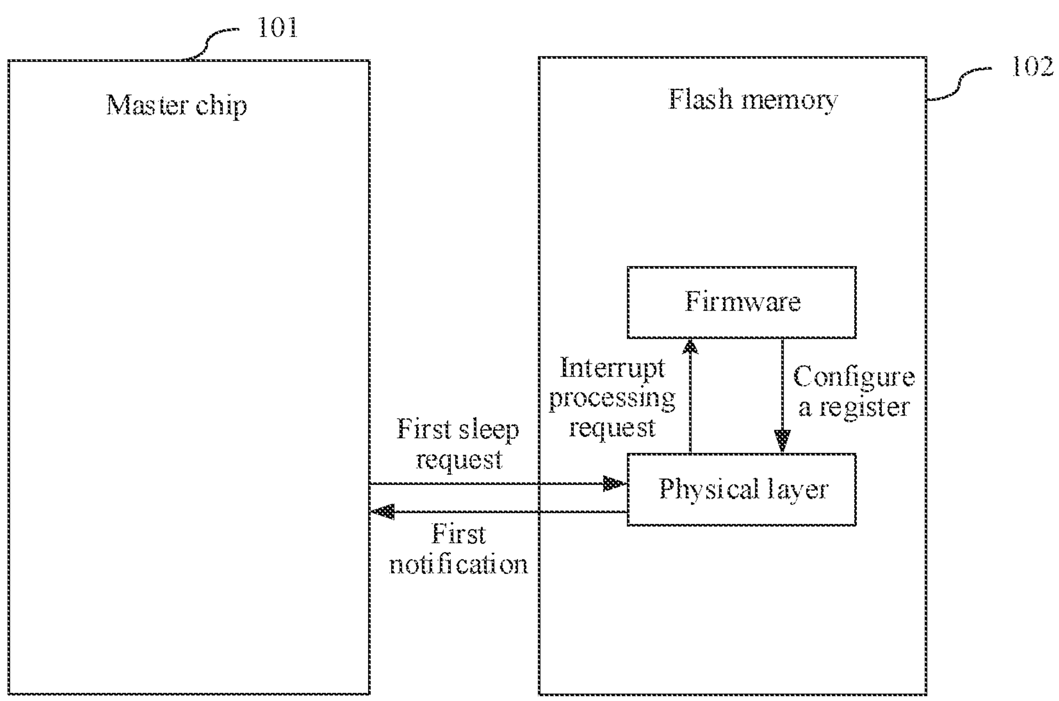
FIG. 3 is a diagram of a principle in which a flash memory detects an execution status of a working command initiated by a local end according to an embodiment of this application.

For example, as shown in FIG. 3, after receiving the first sleep request, the physical layer of the flash memory 102 first does not enter a sleep preparation state, and does not send an acknowledgment indication of entering the sleep state to the master chip 101, but sends an interrupt processing request to the firmware of the flash memory 102. The firmware of the flash memory 102 detects the execution status of the working command in response to the interrupt processing request. Finally, the firmware of the flash memory 102 sends a detection result to the physical layer. For example, the firmware of the flash memory 102 configures a register at the physical layer of the flash memory 102, and the register indicates the flash memory 102 to send a first notification to the master chip 101. The first notification indicates the execution status of the working command and that the first sleep request does not conflict with execution of the working command.

The flash memory 102 performs different operations based on different execution statuses of working commands. Still refer to FIG. 2. The message notification method may further include the following steps.

In S202, if the flash memory 102 detects that there is a working command in a being-executed state or a to-be-executed state, S203 is performed.

S203: The flash memory 102 sends the first notification to the master chip 101, and the master chip 101 receives the first notification from the flash memory 102.

The first notification indicates that there is a working command in a being-executed state or a to-be-executed state and the first sleep request conflicts with execution of the working command. For example, a value of a field PACP_PWR_cnf included in the first notification may be "conflict (conflict)". Herein, "conflict" may alternatively be represented by using a binary number. For example, a binary number 1 is used to represent "conflict". This is not specifically limited in this embodiment of this application. Specifically, the flash memory 102 sends the first notification to the master chip 101 through the second transmission channel. After the master chip 101 receives the first notification indicating that there is the working command in the being-executed state or the to-be-executed state, it indicates that the first sleep request initiated by the master chip 101 conflicts with the working command of the flash memory 102, and the master chip 101 and the flash memory 102 fail to enter a sleep state this time.

S204: The flash memory 102 continues to execute the working command.

After receiving the first notification, the physical layer of the master chip 101 sends the first notification to the firmware of the master chip 101. The firmware of the master chip 101 parses the first notification, and performs S205 if learning that the value of the field PACP_PWR_cnf in the first notification is "conflict".

S205: The master chip 101 starts a timer, to start timing.

If the value that is in the first notification and that is obtained by the master chip 101 is "conflict (conflict)", to ensure that the flash memory 102 can continue to execute the working command, the master chip 101 may not enter a sleep state temporarily, and does not control the flash memory 102 to enter the sleep state, but starts the timer for timing. For example, the firmware of the master chip 101 or a UFSHCI may start the timer to start timing. In a timing process of the timer, the flash memory 102 continues to execute the working command.

An expiration value of the timer is set to 50 ms, 100 ms, 200 ms, or the like. This is not limited herein.

S206: Timing of the master chip 101 expires.

For example, when timing of the timer reaches the expiration value of the timer, it may be considered that timing of the master chip 101 expires.

S207: The master chip 101 sends a second sleep request to the flash memory 102, and the flash memory 102 receives the second sleep request from the master chip 101, and returns to perform S203.

Similar to the first sleep request, the master chip 101 also sends the second sleep request through the first transmission channel.

Similarly, when the flash memory 102 receives the second sleep request, the flash memory 102 returns to perform S203. If the flash memory 102 detects that there is a working command in a being-executed state or a to-be-executed state, S204 to S207 continue to be performed.

If the flash memory 102 detects that there is no working command in a being-executed state or a to-be-executed state, the flash memory 102 sends a second notification to the master chip 101, and the master chip 101 receives the second notification from the flash memory 102. The second notification indicates that there is no working command in a being-executed state or a to-be-executed state and the first sleep request does not conflict with execution of the working command. For example, a value of a field PACP_PWR_cnf included in the second notification may be "ok (ok)" or a binary number "0". The firmware of the master chip 101 parses the second notification to obtain content "ok (ok)" or "0" of the second notification. Then, the master chip 101 enters a sleep state, and the flash memory 102 enters a sleep state. In this way, when execution of the working command of the flash memory 102 is not completed, the flash memory 102 is preferentially satisfied to execute the working command. When execution of the working command of the flash memory 102 is completed, the master chip 101 and the flash memory 102 separately enter a sleep state according to an agreed procedure. This can reduce power consumption and avoid a loss of the working command of the flash memory 102.

Based on the message notification method shown in FIG. 2, after receiving the first sleep request from the master chip, the flash memory 102 may automatically detect the execution status of the working command initiated by the local end, and actively send a detection result to the master chip 101. Therefore, the master chip 101 can obtain the execution status of the working command of the flash memory 102 without sending a plurality of query commands to the flash memory 102. This can effectively reduce signaling overheads between the master chip 101 and the flash memory 102, improve sleep efficiency, and reduce power consumption. In addition, the execution status of the working command is actively sent by the flash memory 102 to the master chip 101, but is not queried by the master chip 101 by sending a query command. Therefore, regardless of a sleep request actively initiated by software of the master chip 101 or a sleep request actively initiated by a logic circuit of the master chip 101, the master chip 101 can obtain the execution status of the working command of the flash memory. This can ensure that the working command of the flash memory 102 is not lost and ensure integrity of the data read/write operation, or ensure reliability of entering a sleep state by the flash memory 102.

Figure 4:
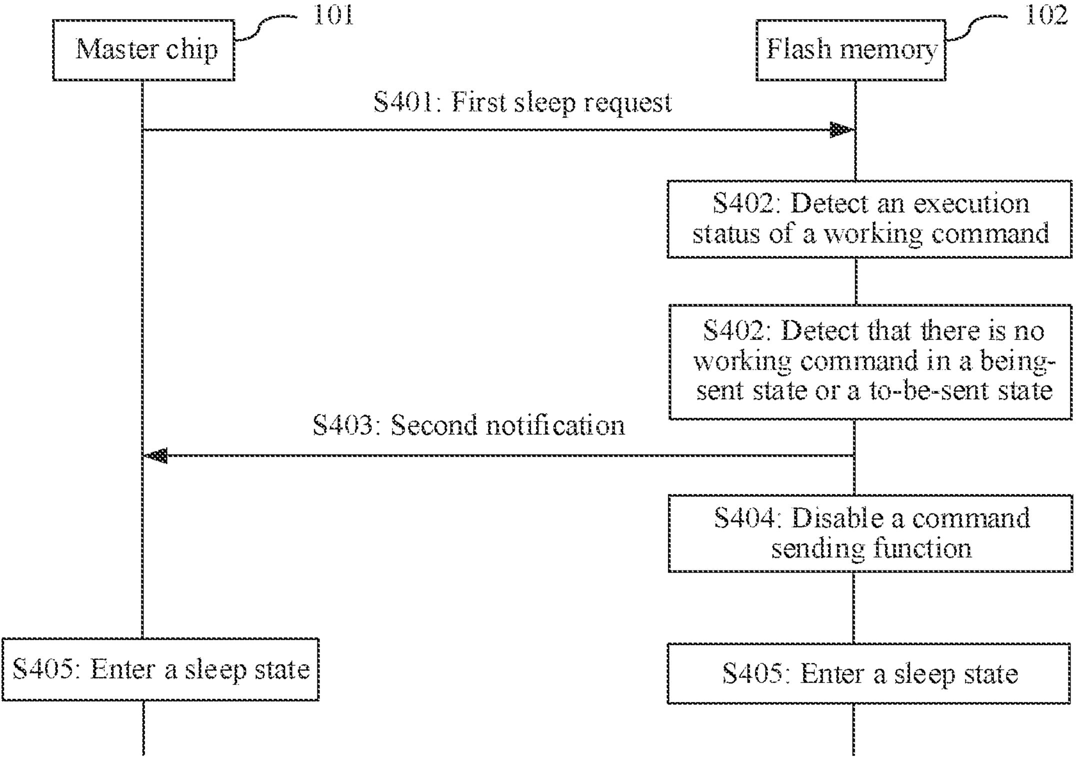
FIG. 4 is a schematic flowchart 2 of a message notification method according to an embodiment of this application.

For example, FIG. 4 is a schematic flowchart 2 of a message notification method according to an embodiment of this application. For example, the mobile phone 100 is the foregoing electronic device. The message notification method may be applied to the flash memory 102 and the master chip 101 of the mobile phone 100. The method may include the following steps.

S401: The master chip 101 sends a first sleep request to the flash memory 102, and the flash memory 102 receives the first sleep request from the master chip 101.

S402: The flash memory 102 detects an execution status of a working command initiated by a local end.

For specific implementation of S401 and S402, refer to S201 and S202. Details are not described herein again.

It should be noted that, in S402, if the flash memory 102 detects that there is no working command in a being-executed state or a to-be-executed state, S403 may be performed.

S403: The flash memory 102 sends a second notification to the master chip 101, and the master chip 101 receives the second notification from the flash memory 102.

The second notification indicates that there is no working command in a being-executed state or a to-be-executed state and the first sleep request does not conflict with execution of the working command. For example, a value of a field PACP_PWR_cnf in the second notification may be "ok (ok)". Herein, "ok" may alternatively be represented by using a binary number. For example, a binary number 0 is used to represent "ok". This is not specifically limited in this embodiment of this application. Specifically, the flash memory 102 may send the second notification to the master chip 101 through a second transmission channel. Correspondingly, the master chip 101 may receive the second notification from the flash memory 102 through the second transmission channel.

It should be noted that, if a new working command needs to be executed after the flash memory 102 sends the second notification to the master chip 101, the master chip 101 may continue to be notified that a read/write operation is to be performed. However, after receiving the second notification from the flash memory 102, the master chip 101 may have entered a sleep state, and therefore cannot receive the notification of performing the read/write operation. Consequently, a loss of the working command is still caused. To resolve this problem, the message notification method may further include the following steps.

S404: The flash memory 102 disables a command sending function.

Specifically, firmware and/or a physical layer of the flash memory 102 may disable the command sending function. After the flash memory 102 disables the command sending function, even if a working command is generated again, the flash memory no longer sends the working command to the master chip. Therefore, a loss of the working command is not caused.

S405: The master chip 101 enters a sleep state, and the flash memory 102 enters a sleep state.

For example, a specific implementation process of S403 may include: After receiving the second notification, the master chip 101 sends a first particular sequence to the flash memory 102, and the flash memory 102 receives the first particular sequence. The master chip 101 and the flash memory 102 disable a first transmission channel based on the first sequence. Similarly, the flash memory 102 may send a second particular sequence to the master chip 101, and the master chip 101 receives the second particular sequence. The master chip 101 and the flash memory 102 disable the second transmission channel based on the second particular sequence. Finally, the master chip 101 enters the sleep state, and the flash memory 102 enters the sleep state. The first particular sequence and the second particular sequence each may be a jump signal including a plurality of level signals.

It should be noted that, when the master chip 101 is woken up, for example, the master chip further receives a service that needs to be processed, the master chip 101 may wake up the flash memory 102. After being woken up, the flash memory 102 enables the command sending function, to send, to the master chip 101, a working command that is not sent before.

Based on the message notification method shown in FIG. 4, after receiving the first sleep request from the master chip, the flash memory 102 may automatically detect the execution status of the working command initiated by the local end, and actively send a detection result to the master chip 101. Therefore, the master chip 101 can obtain the execution status of the working command of the flash memory 102 without sending a plurality of query commands to the flash memory 102. This can effectively reduce signaling overheads between the master chip 101 and the flash memory 102, improve sleep efficiency, and reduce power consumption. In addition, the execution status of the working command is actively sent by the flash memory 102 to the master chip 101, but is not queried by the master chip 101 by sending a query command. Therefore, regardless of a sleep request actively initiated by software of the master chip 101 or a sleep request actively initiated by a logic circuit of the master chip 101, the master chip 101 can obtain the execution status of the working command of the flash memory. This can ensure that the working command of the flash memory 102 is not lost and ensure integrity of the data read/write operation, or ensure reliability of entering a sleep state by the flash memory 102.

Figure 5:
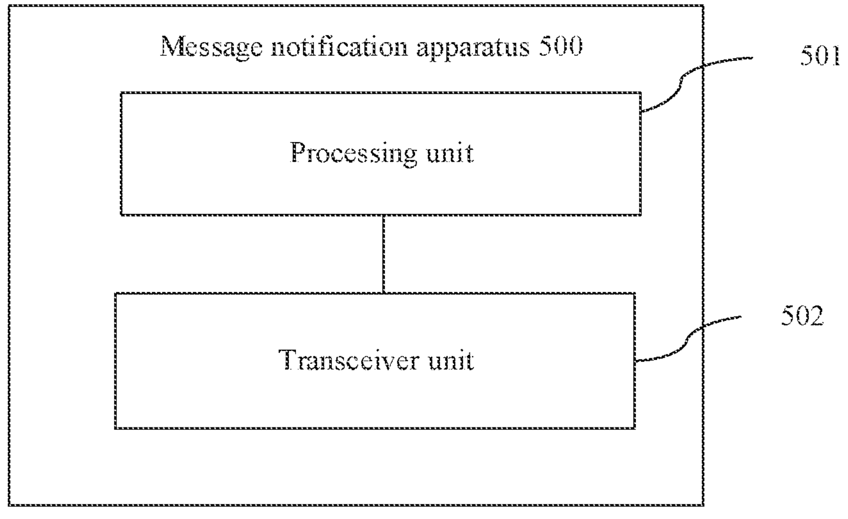
FIG. 5 is a schematic diagram 1 of a structure of a message notification apparatus according to an embodiment of this application.

For example, FIG. 5 is a schematic diagram 1 of a structure of a message notification apparatus 500 according to an embodiment of this application. The message notification apparatus 500 is used in the flash memory 102, and may be configured to perform the message notification method performed by the flash memory 102 in FIG. 2 or FIG. 4. It should be noted that, a basic principle and a technical effect of the message notification apparatus 500 provided in this embodiment of this application are the same as those in the foregoing embodiment. For brief description, for parts that are not mentioned in this embodiment, refer to corresponding content in the foregoing embodiment. As shown in FIG. 5, the message notification apparatus 500 includes a transceiver unit 501 and a processing unit 502. The transceiver unit 501 is configured to perform S201, S203, S207, S401, and S403, and the processing unit 502 is configured to perform S202, S204, S402, S404, and S405.

Figure 6:
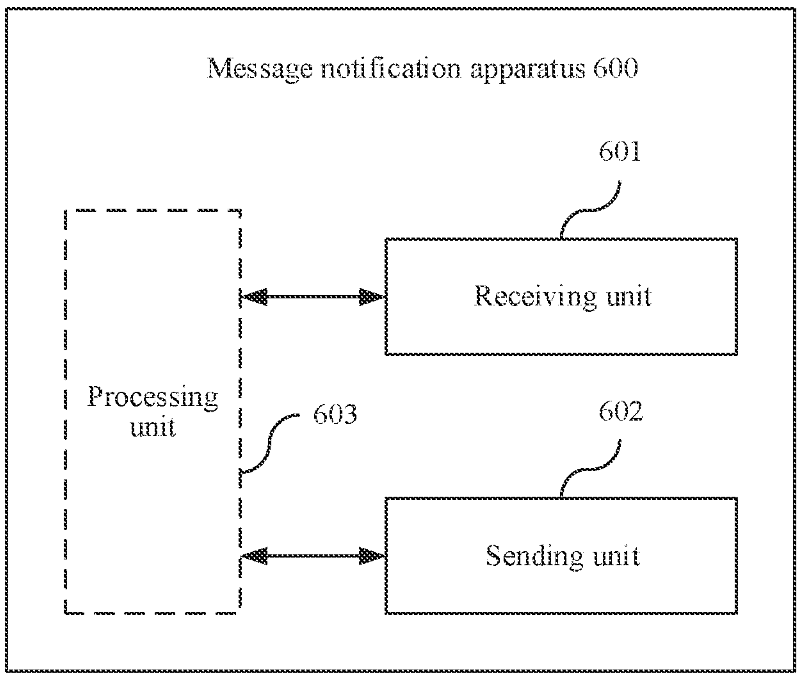
FIG. 6 is a schematic diagram 2 of a structure of a message notification apparatus according to an embodiment of this application.

For example, FIG. 6 is a schematic diagram 2 of a structure of a message notification apparatus 600 according to an embodiment of this application. The message notification apparatus 600 is used in the master chip 101, and may be configured to perform the message notification method performed by the master chip 101 in FIG. 2 or FIG. 4. It should be noted that, a basic principle and a technical effect of the message notification apparatus 600 provided in this embodiment of this application are the same as those in the foregoing embodiment. For brief description, for parts that are not mentioned in this embodiment, refer to corresponding content in the foregoing embodiment.

As shown in FIG. 6, the message notification apparatus 600 includes a sending unit 601, a receiving unit 602, and a processing unit 603. The sending unit 601 is configured to perform S201, S203, and S207. The receiving unit 602 is configured to perform S401 and S403. The processing unit 603 is configured to perform S205, S206, and S405.

Figure 7:
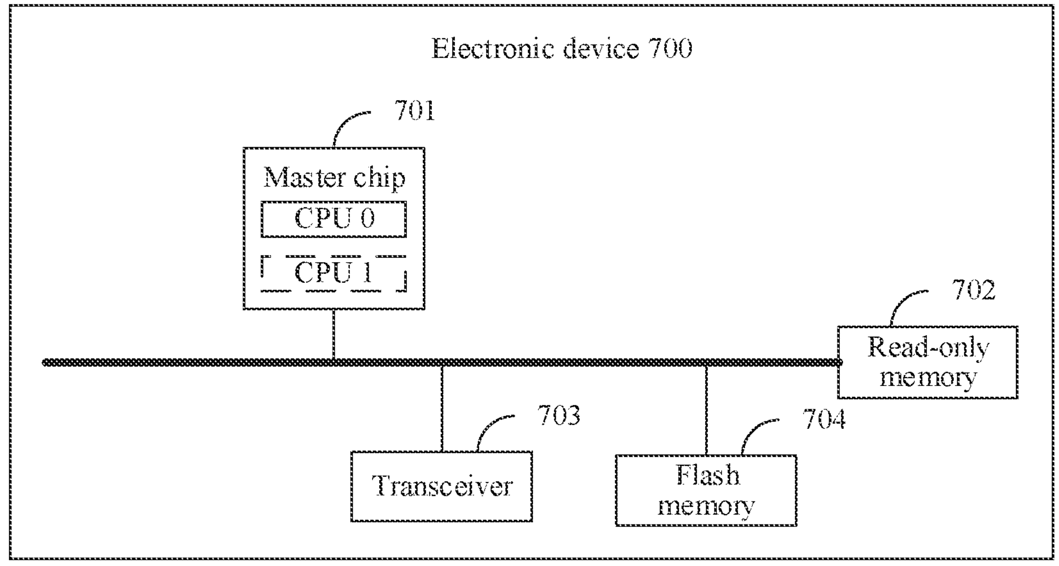
FIG. 7 is a schematic composition diagram of a structure of an electronic device according to an embodiment of this application.

For example, FIG. 7 is a schematic diagram of a structure of an electronic device 700 according to an embodiment of this application. Each component of the electronic device 700 is described below in detail with reference to FIG. 7.

A master chip 701 is a control center of the electronic device 700, and may include one processor, or may include a plurality of processors. For example, the master chip 701 includes one or more central processing units (central processing unit, CPU), or may include an application-specific integrated circuit (application-specific integrated circuit, ASIC), or may include one or more integrated circuits configured to implement embodiments of this application, for example, one or more microprocessors (digital signal processor, DSP) or one or more field programmable gate arrays (field programmable gate array, FPGA).

Optionally, the master chip 701 may run or execute a software program stored in a read-only memory 702 and invoke data stored in the read-only memory 702, to perform various functions of the electronic device 700. For example, the master chip 701 may perform S201, S203, S205, S207, S207, S401, S403, and S405 in the foregoing embodiments of this application. This is not limited herein.

In specific implementation, in an embodiment, the master chip 701 may include one or more CPUs, for example, a CPU 0 and a CPU 1 shown in FIG. 7.

The read-only memory 702 is configured to store a software program for performing the solutions of this application, and the master chip 701 controls execution of the software program. For a specific implementation, refer to the foregoing method embodiments. Details are not described herein again.

Optionally, the read-only memory 702 may be an electrically erasable programmable read-only memory (electrically erasable programmable read-only memory, EEPROM), a compact disc read-only memory (compact disc read-only memory, CD-ROM) or other compact disc storage, optical disc storage (including a compressed optical disc, a laser disc, an optical disc, a digital versatile disc, a Blu-ray disc, or the like), a magnetic disk storage medium or another magnetic storage device, or any other medium capable of carrying or storing expected program code in a form of an instruction or a data structure and capable of being accessed by a computer. However, this is not limited. The read-only memory 702 may be integrated with the master chip 701, or may exist independently and is coupled to the master chip 701 by using an interface circuit (not shown in FIG. 7) of the electronic device 700. This is not specifically limited in this embodiment of this application.

A transceiver 703 is configured to communicate with another electronic device. For example, the electronic device 700 is an electronic device, and the transceiver 703 may be configured to communicate with a network device, or communicate with another electronic device. For another example, the electronic device 700 is a network device, and the transceiver 703 may be configured to communicate with an electronic device, or communicate with another network device.

Optionally, the transceiver 703 may include a receiver and a transmitter (not separately shown in FIG. 7). The receiver is configured to implement a receiving function, and the transmitter is configured to implement a sending function.

Optionally, the transceiver 703 may be integrated with the master chip 701, or may exist independently and is coupled to the master chip 701 by using an interface circuit (not shown in FIG. 7) of the electronic device 700. This is not specifically limited in this embodiment of this application.

A flash memory 704 is a memory that is built based on a serial data transmission technology and that is allowed to be erased or written a plurality of times in an operation. Although there are only two data channels between an internal storage unit of the flash memory and the master chip, an actual data transmission speed of the flash memory is very high because serial data transmission is used. The UFS supports a full-duplex mode. All data channels can perform a read/write operation at the same time, and a data read/write response speed is very high. The flash memory 704 may perform S201, S202, S203, S204, S207, S401, S402, S403, S404, and S405 in the foregoing embodiments of this application.

It should be noted that the structure of the electronic device 700 shown in FIG. 7 does not constitute a limitation on the message notification apparatus. An actual message notification apparatus may include more or fewer components than those shown in the figure, or combine some components, or have different component arrangements.

In addition, for technical effects of the electronic device 700, refer to the technical effects of the message notification method described in the foregoing method embodiments. Details are not described herein again.

An embodiment of this application further provides a computer-readable storage medium. The computer-readable storage medium stores computer program code, and when a processor executes the computer program code, an electronic device performs the method in the foregoing embodiments.

An embodiment of this application further provides a computer program product. When the computer program product runs on an electronic device, the electronic device is enabled to perform the method in the foregoing embodiments.

An embodiment of this application further provides a chip system, including a processor. The processor is coupled to a memory. The memory is configured to store a program or instructions. When the program or the instructions is/are executed by the processor, the chip system is enabled to implement the method according to any one of the foregoing method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be a field programmable gate array (field programmable gate array, FPGA), an application-specific integrated circuit (application-specific integrated circuit, ASIC), a system on a chip (system on a chip, SoC), a central processing unit (central processing unit, CPU), a network processor (network processor, NP), a digital signal processor (digital signal processor, DSP), a micro controller unit (micro controller unit, MCU), a programmable logic device (programmable logic device, PLD), or another integrated chip.

An embodiment of this application provides a message notification system. The message notification system includes one or more terminal devices and/or one or more network devices.

It should be understood that, the processor in embodiments of this application may be a central processing unit (central processing unit, CPU). The processor may alternatively be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

It should be further understood that the memory in embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through an example rather than a limitative description, random access memories (random access memory, RAM) in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware (for example, a circuit), firmware, or any combination thereof. When software is used to implement embodiments, the foregoing embodiments may be implemented in a form of a computer program product. The computer program product includes one or more computer instructions or computer programs. When the computer instructions or computer programs are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects, and represents that three relationships may exist. For example, A and/or B may represent the following three cases: Only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In this application, "at least one" means one or more, and "a plurality of" means two or more. "At least one of the following items (pieces)" or a similar expression thereof refers to any combination of these items, including a single item (piece) or any combination of a plurality of items (pieces). For example, at least one of a, b, or c may represent a, b, c, a and b, a and c, b and c, or a, b, and c, where a, b, and c may be singular or plural.

It should be understood that in embodiments of this application, sequence numbers of processes do not mean a sequence of execution. The sequence of execution of the processes should be determined according to functions and internal logic of the processes, and should not constitute any limitation on an implementation process of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are implemented by hardware or software depends on specific applications and design constraints of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a specific working process of the foregoing described system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division. In actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces, and indirect couplings or communication connections between apparatuses or units may be implemented in an electrical, mechanical, or another form.

The units described as separate parts may or may not be physically separate, and parts displayed as units may or may not be physical units, may be located in one place, or may be distributed on a plurality of network units. Some or all of the units may be selected according to an actual requirement to achieve the objectives of the solutions in the embodiments.

In addition, function units in embodiments of this application may be integrated into one processing unit, or each unit may exist alone physically, or two or more units may be integrated into one unit.

When the function is implemented in a form of a software function unit and sold or used as an independent product, the function may be stored in a computer-readable storage medium. Based on such an understanding, the technical solutions of this application essentially, or the part contributing to the conventional technology, or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application. However, the protection scope of this application is not limited thereto. Any change or replacement readily figured out by a person skilled in the art within the technical scope disclosed in this application shall fall within the protection scope of this application. Therefore, the protection scope of this application shall be subject to the protection scope of the claims.

What is claimed is:

1. A message notification method, applied to a flash memory of a terminal device, wherein the terminal device further comprises a master chip, and the method comprises:
- receiving, by the flash memory, a first sleep request from the master chip;
- detecting, by the flash memory, an execution status of a working command initiated by a local end, wherein the working command comprises a command to initiate a read/write operation with the master chip;
- sending, by the flash memory, a first notification to the master chip, wherein the first notification indicates the execution status of the working command and whether the first sleep request that is received from the master chip conflicts with execution of the working command, wherein the first notification indicates that there is a working command in a being-executed state or a to-be-executed state and that the first sleep request conflicts with execution of the working command; and
- after the sending the first notification to the master chip, receiving by the flash memory, a second sleep request from the master chip.

2. The method according to claim 1, wherein after the sending, by the flash memory, a first notification to the master chip, the method further comprises:
- continuing, by the flash memory, to execute the working command.

3. The method according to claim 1, wherein after the sending, by the flash memory, a first notification to the master chip, the method further comprises:
- disabling, by the flash memory, a command sending function; and
- entering, by the flash memory, a sleep state.

4. The method according to claim 3, wherein the command sending function is disabled by at least one of a physical layer or firmware of the flash memory.

5. The method according to claim 1, wherein a protocol stack of the flash memory comprises a physical layer and firmware; and
- the detecting, by the flash memory, an execution status of a working command comprises:
- sending, by the physical layer, an interrupt processing request to the firmware after receiving the first sleep request;
- detecting, by the firmware, the execution status of the working command in response to the interrupt processing request; and
- sending, by the firmware, a detection result to the physical layer.

6. An electronic device, comprising:
- a flash memory;
- a read-only memory; and
- one or more computer programs, wherein the one or more computer programs are stored in the read-only memory, and when the computer programs are executed by the flash memory, the electronic device is enabled to perform the message notification method according to claim 1.

7. The method according to claim 1, wherein the sending, by the flash memory, a first notification to the master chip further comprises:
- configuring, by firmware of the flash memory, a register at a physical layer of the flash memory; and indicating, by the register, the flash memory to send the first notification to the master chip.

8. A message notification apparatus, used in a flash memory of a terminal device, wherein the terminal device further comprises a master chip, and the apparatus comprises a transceiver and at least one processor, wherein the transceiver is configured to receive a first sleep request from the master chip;

the at least one processor is configured to detect an execution status of a working command initiated by a local end, wherein the working command comprises a command to initiate a read/write operation with the master chip; and the transceiver is further configured to send a first notification to the master chip, wherein the first notification indicates the execution status of the working command and whether the first sleep request that is received from the master chip conflicts with execution of the working command, wherein a protocol stack of the flash memory comprises a physical layer and firmware, the transceiver is configured to be used by the physical layer to send an interrupt processing request to the firmware after the first sleep request is received, the firmware is configured to detect the execution status of the working command in response to the interrupt processing request, and the firmware is configured to send a detection result to the physical layer.

9. The apparatus according to claim 8, wherein the first notification indicates that there is a working command in a being-executed state or a to-be-executed state and that the first sleep request conflicts with execution of the working command.

10. The apparatus according to claim 9, wherein the at least one processor is further configured to continue to execute the working command after the first notification is sent to the master chip.

11. The apparatus according to claim 9, wherein the transceiver is further configured to receive a second sleep request from the master chip after the flash memory sends the first notification to the master chip.

12. The apparatus according to claim 8, wherein the first notification indicates that there is no working command in a being-executed state or a to-be-executed state and that the first sleep request does not conflict with execution of the working command.

13. The apparatus according to claim 12, wherein the transceiver is further configured to: after the flash memory sends the first notification to the master chip, disable a command sending function and enter a sleep state.

14. The apparatus according to claim 13, wherein the command sending function is disabled by at least one of a physical layer or firmware of the flash memory.

15. The apparatus according to claim 8, wherein the sending a first notification to the master chip further comprises:

configuring, by the firmware of the flash memory, a register at the physical layer of the flash memory; and indicating, by the register, the flash memory to send the first notification to the master chip.

16. A message notification method, applied to a master chip of a terminal device, wherein the terminal device further comprises a flash memory, and the method comprises:

sending, by the master chip, a first sleep request to the flash memory; and receiving, by the master chip, a first notification from the flash memory, wherein the first notification indicates an execution status of a working command and whether the first sleep request that is received from the master chip conflicts with execution of the working command, and the working command comprises a command for the flash memory to initiate a read/write operation with the master chip, wherein the first notification indicates that there is a working command in a being-executed state or a to-be-executed state and that the first sleep request conflicts with execution of the working command; and after the receiving, by the master chip, a first notification from the flash memory, the method further comprises:

starting, by the master chip, a timer; and sending, by the master chip, a second sleep request to the flash memory after the timer expires.

17. The method according to claim 16, wherein the timer is started by firmware of the master chip or by a universal flash storage host controller interface (UFSHCI).

18. A message notification apparatus, used in a master chip of a terminal device, wherein the terminal device further comprises a flash memory, and the apparatus comprises a transmitter and a receiver, wherein the transmitter is configured to send a first sleep request to the flash memory; and the receiver is configured to receive a first notification from the flash memory, wherein the first notification indicates an execution status of a working command and whether the first sleep request that is received from the master chip conflicts with execution of the working command, and the working command comprises a command for the flash memory to initiate a read/write operation with the master chip, wherein the first notification indicates that there is a working command in a being-executed state or a to-be-executed state and that the first sleep request conflicts with execution of the working command, and the apparatus further comprises:

at least one processor, configured to start a timer; and wherein the transmitter is further configured to send a second sleep request to the flash memory after the timer expires.

19. The apparatus according to claim 18, wherein the timer is started by firmware of the master chip or by a universal flash storage host controller interface (UFSHCI).

20. The apparatus according to claim 18, wherein a protocol stack of the master chip comprises firmware and a physical layer.

* * * * *